US006666927B2

United States Patent
Gindel

(10) Patent No.: US 6,666,927 B2
(45) Date of Patent: Dec. 23, 2003

(54) VACUUM DEBRIS REMOVAL SYSTEM FOR AN INTEGRATED CIRCUIT MANUFACTURING DEVICE

(75) Inventor: Sharone Gindel, Rio Rancho, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/845,842

(22) Filed: Apr. 30, 2001

(65) Prior Publication Data
US 2002/0157689 A1 Oct. 31, 2002

(51) Int. Cl.$^7$ .................................................. B08B 5/04
(52) U.S. Cl. .............................. 134/21; 134/42; 15/303
(58) Field of Search ............................ 134/21, 1.2, 1.3, 134/42; 15/303, 310; 119/121.84

(56) References Cited

U.S. PATENT DOCUMENTS

| | | | | |
|---|---|---|---|---|
| 5,424,508 A | * | 6/1995 | Swain et al. ............ | 219/121.84 |
| 5,603,775 A | * | 2/1997 | Sjoberg ........................ | 134/21 |
| 5,932,013 A | * | 8/1999 | Salli et al. ................... | 118/715 |
| 6,059,893 A | * | 5/2000 | Kawasaki ...................... | 134/37 |
| 6,494,965 B1 | * | 12/2002 | Walker et al. .................. | 134/21 |

* cited by examiner

Primary Examiner—Randy Gulakowski
Assistant Examiner—Saeed Chaudhry
(74) Attorney, Agent, or Firm—Schwegman, Lundberg, Woessner & Kluth, P.A.

(57) ABSTRACT

A vacuum debris removal system and method for an integrated circuit manufacturing device is disclosed. The vacuum debris removal system comprises at least one vacuum tube. An opening is formed in the at least one vacuum tube at a selected location to cause air flow away from an element of the integrated circuit manufacturing device.

11 Claims, 4 Drawing Sheets

VACUUM DEBRIS REMOVAL SYSTEM FOR AN INTEGRATED CIRCUIT MANUFACTURING DEVICE

FIELD OF THE INVENTION

The present invention relates generally to manufacturing integrated circuits and the like, and more particularly to a vacuum debris removal system for an integrated circuit manufacturing device.

BACKGROUND INFORMATION

In the manufacturing of semiconductor devices and integrated circuits, multiple layers of different types of materials, such as conductive, semiconductive, and insulation type materials, are deposited or formed on a substrate, semiconductor die or wafer. Selected portions of the different layers may be removed in predetermined patterns by etching, photolithography or other material removal techniques, or ions or charged particles may be implanted in selected areas to form different semiconductor regions and components of a semiconductor device or integrated circuit. In a photolithographic process, a layer of resist material is formed on an underlying layer of material from which material is to be removed or etched in a predetermined pattern. The resist layer may be exposed to a beam of light, typically ultraviolet light, through a mask so that only selected portions of the resist layer are exposed or the beam of light maybe focused on the resist layer and the semiconductor wafer is moved to expose the selected portions of the resist layer. The semiconductor wafer is then developed to remove the unexposed portions of the resist layer. The underlying layer of material is exposed according to a predetermined pattern after the unexposed portions of the resist layer are removed. The underlying layer or layers of material may then be removed or etched using the remaining portions of the resist layer as mask or etch stop.

The size of the lines forming the patterns in the resist material are typically about 20 to about 100 μm. Accordingly, the beam of light focused on the resist material must be very precise with little if any distortion. When the resist material is exposed to light, a chemical reaction occurs and particles from the resist material can be given off or "outgassed" with some of the particles accumulating on a lens element of the projection optics of an integrated circuit (IC) manufacturing device, such as a photolithographic camera device, microscanning device or the like. One example of such a device is a Micrascan® II/QML. The contamination of the lens element with the outgassed particles from the resist will cause lens distortion and scattering of light from the lens element. The line widths of the pattern or printed layer on the semiconductor wafer will vary as a result of the distortion creating defective products. To remove the contamination, the lens element must be cleaned which results in machine downtime and further risks to the device. If the cleaning is not done properly, both the front and back portions of the lens element could become contaminated or damaged and cleaning the lens element could make it more susceptible to future contamination. Additionally, the lenses in the projection optics of the manufacturing device could become misaligned requiring that the device be rebuilt by the manufacturer.

One known system 100 for removing debris or outgassed particles from resist material is shown in FIG. 1. FIG. 1 shows a face plate 102 for a photolithographic IC manufacturing device (not shown in FIG. 1). The face plate 102 has an exposure slit 104 formed therein through which a beam of light may be focused by projection optics of the photolithographic manufacturing device onto a semiconductor wafer (not shown). The focused beam of light exposes selected portions of a layer of resist material formed on the wafer. As previously described a chemical reaction occurs in the resist material and particles are outgassed that can contaminate a lens element of the projection optics. The debris removal system 100 includes a single stainless steel vacuum tube 106 that is bent around the exposure slit 104. The stainless steel tube 106 is one continuous tube and includes four 90° bends with 2 long sides 108 and two shorter sides 110. The ends 112 and 114 of the stainless steel tube 106 are coupled to a vacuum pump (not shown in FIG. 1). A plurality of holes 115 are formed in the vacuum tube 106 around the perimeter of the exposure slit 104. The tube 106 may have from about 20 to about 56 holes 115 formed therein to draw away outgassed particles from the resist material.

FIG. 2 is a simulation of the air flow in the slit 104 for the tube 106 with eight holes in each long side 108 of the of the tube 106 and two holes in each short side 110. As shown in FIG. 2, two air pockets 202 and 204 are formed by the vacuum through the tube 106 with a dead air space 206 between the air pockets 202 and 204. Outgassed particles can contaminate the lens element of the manufacturing device through the dead air space 206. Additionally, the abrupt changes in air flow direction within the tube 106 caused by the four 90° also adversely affects the suction ability and air flow dynamics within the slit 104 as shown in FIG. 2.

The system 100 with the four 90° bends also presents some manufacturing challenges. Sharp 90° bends are required to closely conform with the perimeter of the exposure slit 104. This requires multiple steps and a significant amount of stress can be placed on the tube 106 resulting in small openings or fissures. Additionally, air flow restrictions can occur in the area of the bends.

Accordingly, for the reason stated above, and for other reasons that will become apparent upon reading and understanding the present specification, there is a need for a vacuum debris removal system that is reliable and effectively removes contaminants and is simple and reliable to manufacture.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
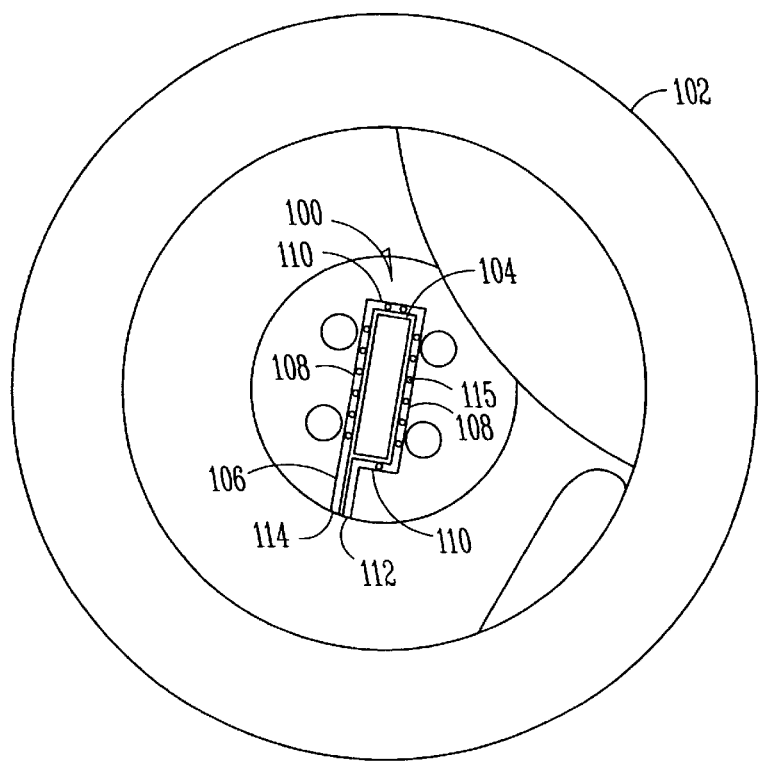
FIG. 1 is a face plate for a photolithographic IC manufacturing device with a prior art vacuum debris removal system.
Figure 2:
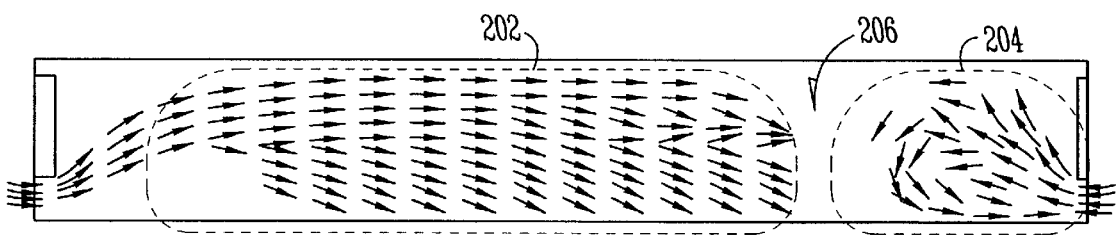
FIG. 2 is a simulation of the air flow created in an exposure slit of a photolithographic manufacturing device by the vacuum debris removal system of FIG. 1.
Figure 3:
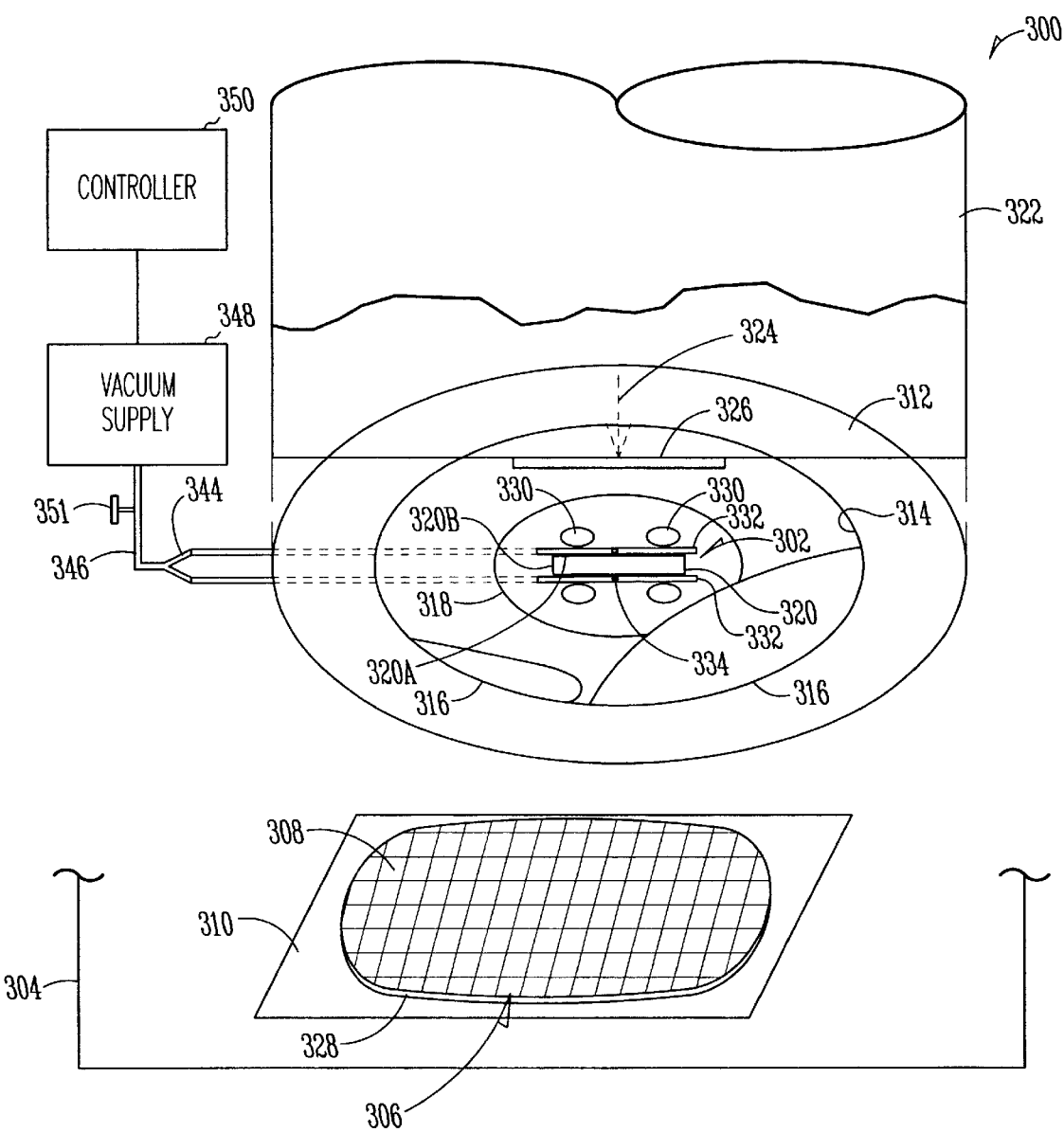
FIG. 3 is a diagram of a portion of an IC manufacturing device, such as a photolithographic manufacturing device or the like, and a vacuum debris removal system in accordance with the present invention.

FIG. 3 is a diagram of a portion of a photolithographic manufacturing device 300, as an example of an integrated circuit manufacturing device, that uses a vacuum debris removal system 302 in accordance with the present invention. The manufacturing device 300 is preferably contained in an environmentally controlled enclosure 304 or room that is partially shown in FIG. 3. A semiconductor wafer 306 to be processed is positioned on a movable wafer stage 310. The semiconductor wafer 306 may be held in place on the movable wafer stage 310 by a vacuum or other arrangement. The semiconductor wafer 306 includes a multiplicity of integrated circuits 308 that are typically the same integrated circuit repeated in each section of the wafer 306.

The manufacturing device 300 includes projection optics 322 to direct or focus a beam of light 324 onto the semiconductor wafer 306 for processing. A face plate 312 is attached at one end of the projection optics 322 proximal to the wafer stage 310. Other openings 316 may be formed in the face plate 312 through which tools or other devices (not shown in the drawings) may be inserted to perform operations on the semiconductor wafer 306. A cap gauge plate 318 is formed or disposed in the face plate 312. An exposure slit 320 is formed in the cap gauge plate 318. The exposure slit 320 may be substantially rectangular shaped with two elongated sides 320a and two shorter sides 320b. The beam of light 324 is projected by the projection optics 322 through the exposure slit 320 and onto the semiconductor wafer 306. The projection optics 322 includes a lens element 326 to focus the beam of light 324 onto selected areas of a layer of resist material 328 formed on the semiconductor wafer 306 to expose the selected areas. A plurality of capacitive gauges 330 are mounted in the cap gauge plate 318 to measure the distance between the semiconductor wafer 306 and the exposure slit 320 so that the height of the wafer stage 310 can be adjusted for proper focus of the light beam 324. Standard photolithographic processing techniques may then be used to remove and deposit layers of materials to form a particular integrated circuit. As previously discussed, when the layer of resist material 328 is exposed to the light beam 324, a chemical reaction occurs and particles are given off or outgassed from the resist material 328 that can contaminate the lens element 326 causing the light beam 324 to distort and scatter. The distorted and scattered light beam 324 then causes inaccurate exposure of the resist material layer 328 and consequently defective integrated circuits.

Figure 4:
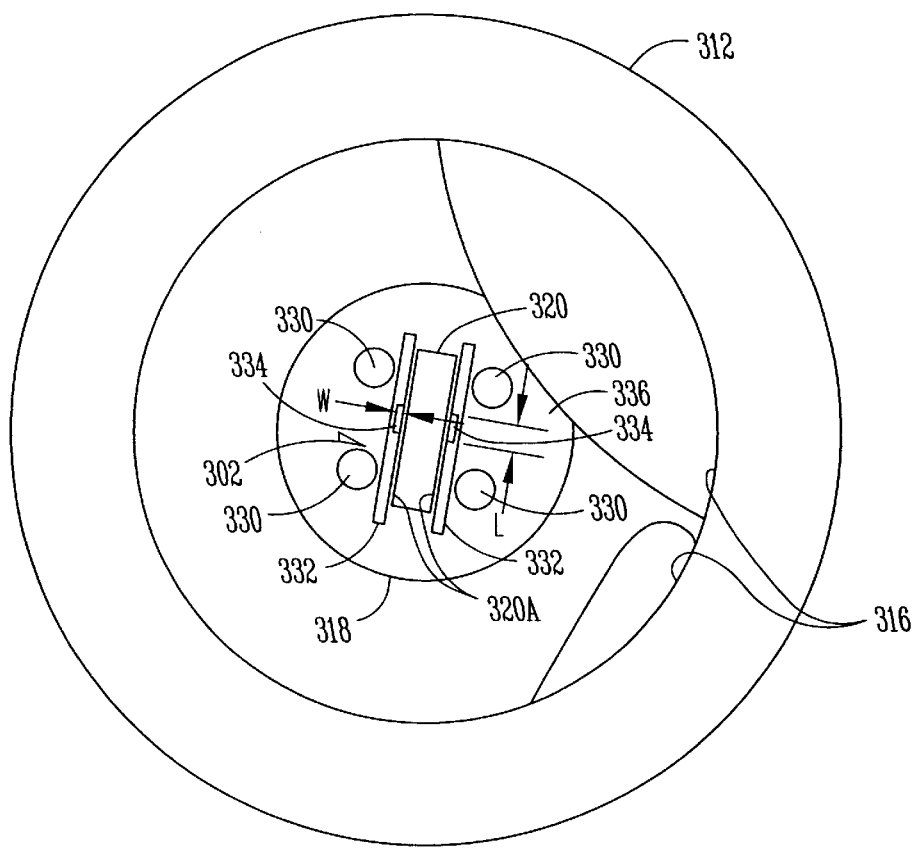
FIG. 4 is a detailed top view of a face plate of a photolithographic manufacturing device and the vacuum debris removal system of FIG. 3.

Referring also to FIG. 4, in accordance with the present invention, the vacuum debris removal system 302 includes a pair of vacuum tubes 332 disposed on the cap gauge plate 318 on either side of the exposure slit 320, one vacuum tube 332 in parallel with each of the longest sides 320a of the exposure slit 320. Each of the vacuum tubes 332 may be made of stainless steel or the like. A single opening 334 is formed in each vacuum tube 332 at a selected location. The selected location is preferably at a midpoint of the exposure slit 320 and in a side of each vacuum tube 332 facing the exposure slit 320. The pair of vacuum tubes 332 and openings 334 provide dual withdrawal of outgassed particles from the lens element 326. The single openings 334 also have a predetermined size and shape. The predetermined size and shape of the openings 334 and the location of the openings 334 relative to the exposure slit 320 are selected to cause air flow in the exposure slit 320 to a central location and away from the lens element 326. This provides a maximum reduction of outgassed particles contaminating the lens element 326 when the resist layer 328 is exposed to the light beam 324 (FIG. 3). The openings 334 preferably each have a substantially rectangular shape with a length "L" of about 0.060 inches and a width "W" of about 0.030 inches to provide proper air flow away from the lens element 326 and therefore minimal contamination. Additionally, the area of each opening 334 should preferably be no larger than about the inside area of the vacuum tube 332 for proper air flow dynamics.

Figure 5:
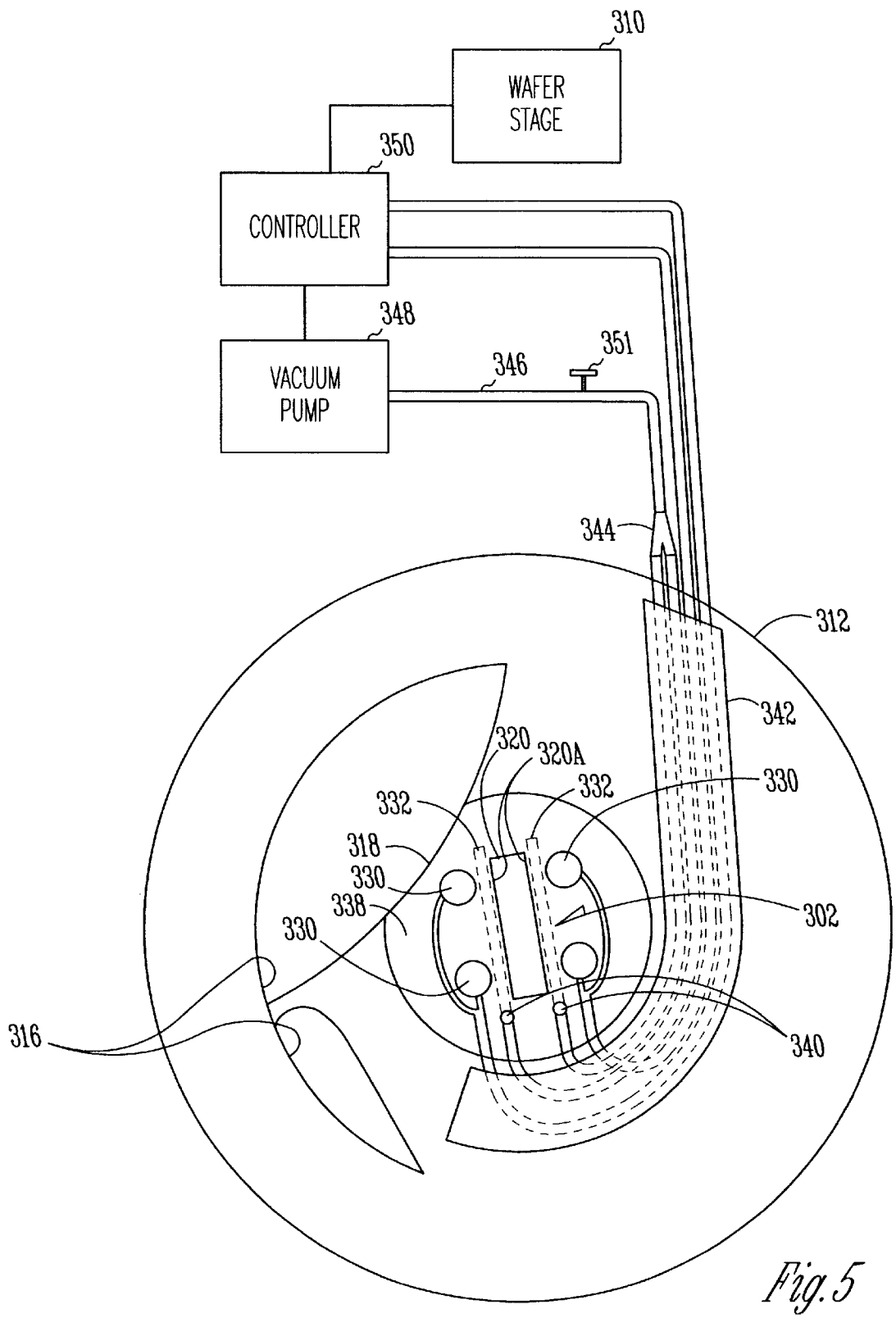
FIG. 5 is a detailed bottom view of the face plate of the photolithographic manufacturing device and the vacuum debris removal system of FIG. 3.

FIG. 5 is a detailed bottom view of the face plate 312 and the vacuum debris removal system 302 in accordance with the present invention. The vacuum tubes 332 pass from a top surface 336 (FIG. 4) of the cap gauge plate 318 to a bottom surface 338 of the cap gauge plate 318 through openings 340 formed in the cap gauge plate 318. The vacuum tubes 332 may then pass into a J-shaped channel 342 that houses and protects the vacuum tubes 332. The J-shaped channel 342 extends to the periphery of the face plate 312 where the vacuum tubes 332 are attached to a connector 344. The connector 344 is preferably attached to a flexible tube 346 that is connected to a vacuum supply 348 that may be an internal vacuum pump or an external vacuum source. As shown in the FIGS. 3 and 4, the vacuum tubes 332 are straight on the cap gauge plate 318 without any bends around the exposure slit 320. The straight vacuum tubes 332 provide less disruption to the air flow and loss of suction pressure through the vacuum tubes 332 compared to one continuous vacuum tube with multiple bends around the exposure slit 320. The straight vacuum tubes 332 are also much easier to manufacture and are more reliable with respect to possible air leaks created by stresses placed on the tubes 332 by the bending.

The vacuum pump 348 may be coupled to a controller 350 to control operation of the vacuum pump 348 or an in-line valve 351 may be provided in the tube 346 to control the vacuum pressure. The vacuum volume or flow of air created by the vacuum pump 348 may be between about 7 and about 14 SCFH (standard cubic feet per hour). This will basically be divided equally between the two vacuum tubes 332. Accordingly, each vacuum tube 332 will preferably draw between about 3.5 and about 7 SCFH. The controller 350 is also electrically connected to the wafer stage 310 to control operation and positioning of the wafer stage 310. The controller 350 is further electrically connected to the capacitor gauges 330 to measure the distance between the face plate 312 and the semiconductor wafer 306 so that the wafer stage 310 can be adjusted for proper alignment and focus of the light beam 324 on selected areas of the wafer 306 to form predetermined patterns in the resist layer 328 when the resist 328 is developed in a subsequent processing step.

Figure 6:
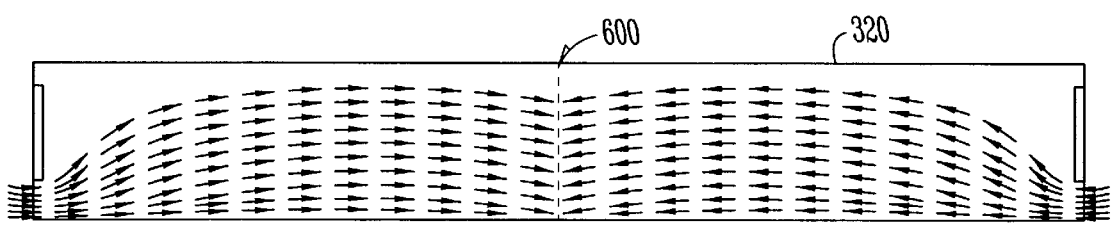
FIG. 6 is a computer simulation of the air flow created in an exposure slit of the photolithographic manufacturing device by the vacuum debris removal system of FIG. 3.

FIG. 6 is a computer simulation of the air flow created in the exposure slit 320 of the photolithographic device 300 by the vacuum debris removal system 302. As shown, the predetermined size and shape of the openings 334 and the selected location of the openings 334 cause air flow in the exposure slit 320 toward a central location 600 and away from the lens element 326 to provide a significant reduction of particles contaminating the lens element 326. The air flow is substantially uniform and there are no air pockets or areas of turbulent air flow that can allow or cause outgassed particles to contaminate the lens element 326.

While the debris removal system 302 has been described as including a pair of vacuum tubes 332 on either side of the exposure slit 320 for dual withdrawal of particles away from the lens element 326, an alternate embodiment for some applications may use only a single vacuum tube. Additionally, the vacuum tubes 332 are shown in the Figures to extend substantially completely the length of the longest sides 320a of the exposure slit 320; however, the vacuum tubes 332 would not necessarily need to extend the entire length of the longest side 320a and could extend only as far as the selected location for the openings 334, such as about the mid-point of the exposure slit 320.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A vacuum debris removal system for an integrated circuit manufacturing device, comprising:
   a plate;
   an slit formed in the plate;
   a pair of vacuum tubes, one disposed on each side of the slit; and
   a single opening formed in each of the vacuum tubes at a selected location.

2. The vacuum debris removal system of claim 1, wherein the selected location of each single opening is at about a mid-point of the slit.

3. The vacuum debris removal system of claim 1, wherein the selected location of each single opening is in a side of each vacuum tube facing the slit.

4. The vacuum debris removal system of claim 1, wherein each single opening has a length of about 0.060 inches and a width of about 0.030 inches.

5. The vacuum debris removal system of claim 1, wherein the slit is substantially rectangular and the pair of vacuum tubes extend substantially parallel to each longest side of the slit to at least about a mid-point of the slit.

6. The vacuum debris removal system of claim 1, wherein the slit is elongate and the vacuum tubes extend respectively parallel to each longest side of the slit.

7. The vacuum debris removal system of claim 1, wherein the selected location of each opening causes air flow in the slit to a central location.

8. The vacuum debris removal system of claim 1, wherein the selected location of each opening causes air flow in the slit away from an element of an integrated circuit manufacturing device.

9. The vacuum debris removal system of claim 1, wherein the selected location of the openings causes a maximum reduction of outgassed particles from a resist material contaminating a lens element of an integrated circuit manufacturing device.

10. The vacuum debris removal system of claim 1, wherein the selected location of the openings causes air flow in the slit for dual withdrawal of particles away from an element of an integrated circuit manufacturing device.

11. The vacuum debris removal system of claim 1, wherein each vacuum tube of the pair of vacuum tubes draws between about 3.5 and about 7 cubic feet per hour of air.

* * * * *